United States Patent
Henderson et al.

(10) Patent No.: US 8,695,022 B2
(45) Date of Patent: Apr. 8, 2014

(54) CONTEXT FOR REPLACEMENT FUNCTIONS

(75) Inventors: Jared E. Henderson, Maple Valley, WA (US); Mark T. Schofield, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 161 days.

(21) Appl. No.: 13/273,070

(22) Filed: Oct. 13, 2011

(65) Prior Publication Data
US 2013/0097621 A1 Apr. 18, 2013

(51) Int. Cl.
*G06F 3/00* (2006.01)
(52) U.S. Cl.
USPC ............................................ 719/328; 719/330
(58) Field of Classification Search
USPC .................................................. 719/328, 330
See application file for complete search history.

(56) References Cited

U.S. PATENT DOCUMENTS

| | | | |
|---|---|---|---|
| 6,304,894 B1 * | 10/2001 | Nakayama et al. | 709/203 |
| 6,463,583 B1 | 10/2002 | Hammond | |
| 6,618,736 B1 * | 9/2003 | Menage | 1/1 |
| 6,779,187 B1 | 8/2004 | Hammond | |
| 6,968,410 B2 * | 11/2005 | Bennett et al. | 710/260 |
| 7,590,977 B2 * | 9/2009 | Archambault et al. | 717/140 |
| 7,703,081 B1 * | 4/2010 | Buches | 717/127 |
| 8,443,354 B1 * | 5/2013 | Satish et al. | 717/156 |
| 2007/0283331 A1 | 12/2007 | Pietrek | |

OTHER PUBLICATIONS

N. De Palma, Ensuring Dynamic Reconfiguration Consistency, 2001.*
Hunt, et al., "Detours: Binary Interception of Win32 Functions", Retrieved at <<http://research.microsoft.com/pubs/68568/huntusenixnt99.pdf>>, Proceedings of the 3rd USENIX Windows NT Symposium, vol. 3, Jul. 1999, pp. 1-9.
Oliva, et al., "Speeding up Thread-Local Storage Access in Dynamic Libraries", Retrieved at <<http://www.lsd.ic.unicamp.br/~oliva/writeups/TLS/paper.pdf>>, GCC Developer's Summit, Nov. 11, 2005, pp. 1-10.
Skaletsky, et al., "Dynamic Program Analysis of Microsoft Windows Applications", Retrieved at <<http://www.cs.virginia.edu/kim/docs/ispass10.pdf>>, IEEE International Symposium on Performance Analysis of Systems & Software May 17, 2010, pp. 11.

* cited by examiner

*Primary Examiner* — Lechi Truong
(74) *Attorney, Agent, or Firm* — Glen Johnson; Micky Minhas; Wolfe-SBMC (57) ABSTRACT

Techniques are described for providing context for replacement functions. In one or more implementations, a context module is provided that can set context information associated with a computing device in memory such that a replacement function can retrieve the context information. When a call to a target function is intercepted and a replacement function is invoked, the replacement function can use the context information to execute one or more tasks associated with the replacement function.

20 Claims, 6 Drawing Sheets

CONTEXT FOR REPLACEMENT FUNCTIONS

BACKGROUND

A typical computing device employs a wide variety of executable program code to perform various tasks. For example, program code can be included as part of an operating system, an application, a utility, and/or other functionality that can be executed via a computing device. Such program code typically includes functions that can be called to perform various tasks. For example, a particular function can be called by an application to calculate a value based on parameters that are passed to the function.

In certain scenarios, it can be useful to intercept a call to a function and redirect the call to a replacement function. For example, a software testing utility can intercept a call to a function by an application. The utility can then redirect the call to a replacement function in order to test various operating scenarios that may arise when the application is executed. Current techniques for introducing replacement functions typically do not enable state information associated with a computing device to be easily provided to a replacement function, thus not fully realizing the value of the replacement function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for providing context for replacement functions. In one or more implementations, a context module is provided that can set context information associated with a computing device in memory such that a replacement function can retrieve the context information. The replacement function can use the context information to execute one or more tasks associated with the function.

For example, a call to a target function can be intercepted and redirected to a context module, e.g., using a hooking technique. The context module can receive the call and, in response, set context information associated with a state of a computing device in a portion of memory. In implementations, the portion of memory can include memory that is known and/or specific to a processing thread associated with a replacement function. The context module can invoke the replacement function, which can access the portion of memory and retrieve the context information. The replacement function can utilize the context information in performing one or more tasks.

In at least some embodiments, techniques can be employed to preserve processor memory state across calls to replacement functions. For example, when a call to a target function is intercepted and redirected to a context module as mentioned above, the context module can save a memory state of processor registers. The context module can call one or more functions to cause context information to be saved in a portion of memory that is accessible to a replacement function. The context module can then restore the memory state of the processor registers using the saved memory state, and jump to the replacement function. Thus, processor memory state can remain consistent when a target function is replaced with a replacement function.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described for providing context for replacement functions. In one or more implementations, a context module is provided that can set context information associated with a computing device in memory such that a replacement function can retrieve the context information. The replacement function can use the context information to execute one or more tasks associated with the function.

For example, a call to a target function can be intercepted and redirected to a context module, e.g., using a function call hooking technique. The context module can receive the call and, in response, set context information associated with a state of a computing device in a portion of memory. In implementations, the portion of memory can include memory that is known and/or specific to a processing thread associated with a replacement function. The context module can invoke the replacement function, which can access the portion of memory and retrieve the context information. The replacement function can utilize the context information in performing one or more tasks.

In at least some embodiments, techniques can be employed to preserve processor memory state across calls to replacement functions. For example, when a call to a target function is intercepted and redirected to a context module as mentioned above, the context module can save a memory state of processor registers. The context module can call one or more functions to cause context information to be saved in a portion of memory that is accessible to a replacement function. The context module can then restore the memory state of the processor registers using the saved memory state, and jump to the replacement function. Thus, processor memory state can remain consistent when a target function is replaced with a replacement function.

In the following discussion, an example environment is first described that is operable to employ techniques for providing context for replacement functions described herein. Next, a section entitled "Example Methods" describes example methods which may be employed in the example environment as well as in other environments. Last, a section entitled "Example System and Device" describes aspects of an example system and an example device that can be utilized to implement one or more embodiments.

Example Environment

Figure 1:
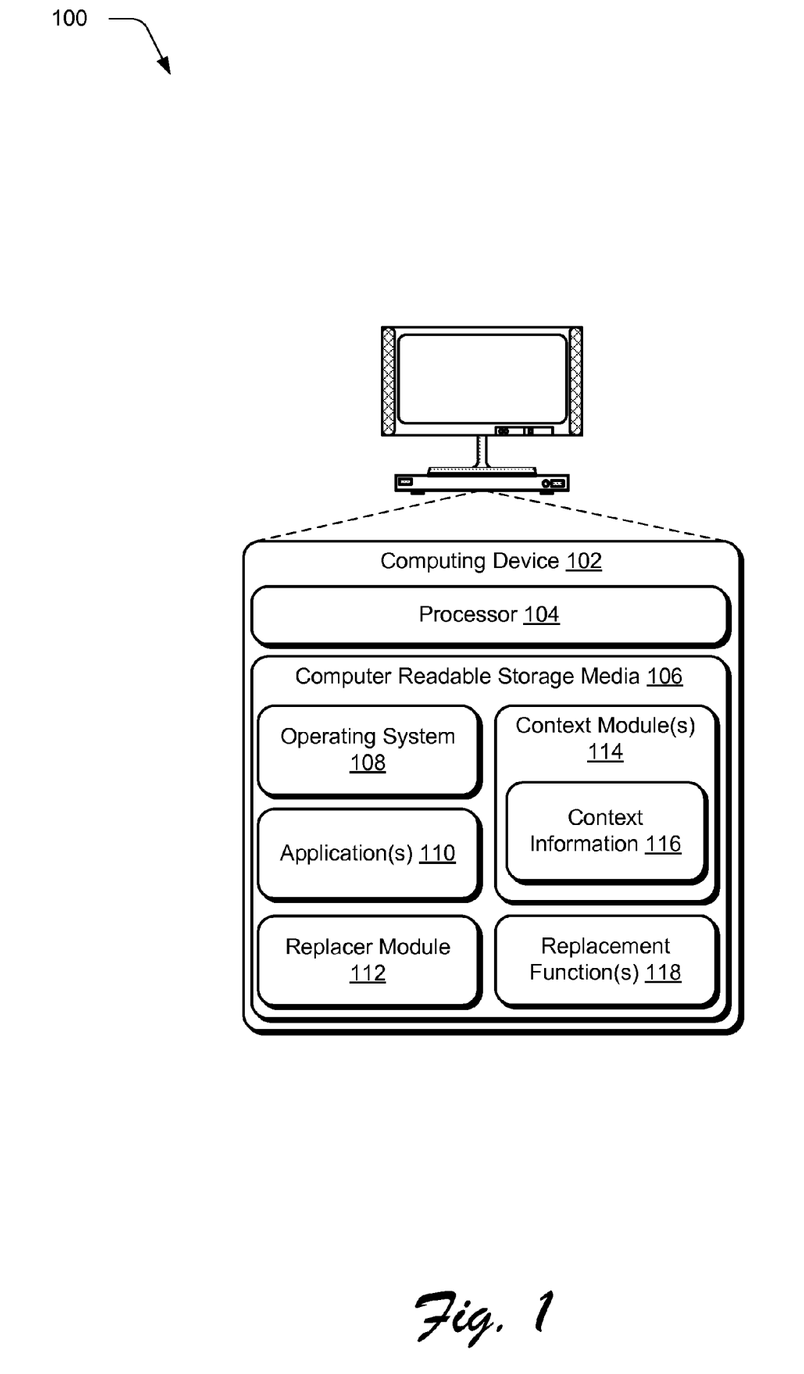
FIG. 1 is an illustration of an environment in an example implementation that is operable to employ techniques for providing context for replacement functions.

FIG. 1 is an illustration of an environment 100 in an example implementation that is operable to employ techniques for providing context for replacement functions. Environment 100 includes a computing device 102 having one or more processors 104 and one or more computer-readable storage media 106. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 5 and 6.

The computing device 102 further includes an operating system 108 and one or more applications 110 that reside on the computer-readable storage media 106 and which are executable by the processor 104. The operating system 108 is representative of functionality to manage and provide access to resources of the computing device 102. The applications 110 are representative of functionalities that enable a wide variety of tasks to be performed via the computing device 102, such as word processing, email, spreadsheet, media content consumption, software and/or hardware testing, and so on.

Further residing on the computer-readable storage media 106 are a replacer module 112, one or more context modules 114, and context information 116 that is included as part of the context modules 114. The replacer module 112 is representative of functionality to enable functions associated with the computing device to be replaced. For example, the replacer module 112 can be employed to intercept a call to a target function and to redirect the call to one of the context modules 114. In implementations, the replacer module 112 is user configurable such that a user can specify a target function to be replaced and a particular one of the context modules 114 to be used to replace the target function.

The context modules 114 are representative of functionality to receive intercepted calls to target functions, set device context from the context information 116 in memory, and invoke one or more replacement functions 118. The context modules 114 can be configured such that a particular context module is specific to a particular target function and/or replacement function. The context modules 114 can also be employed to preserve processor memory state across calls to the replacement functions 118, as is discussed in more detail below.

The context information 116 includes information that can be utilized by the replacement functions 118 to determine whether and/or how to perform tasks. In implementations, each of the context modules 114 includes a unique set of context information 116 that is specific to one or more of the replacement functions 118. Further operational aspects of the context modules 114 and the context information 116 are discussed in more detail below.

The replacement functions 118 are representative of functions that can be employed to replace other functions of the computing device 102. The term "function" refers generally to a portion of code that can be executed by the computing device 102 to perform a task. Examples of functions include routines, subroutines, procedures, methods, subprograms, and so on. In implementations, a user can employ the replacer module 112 to specify a particular target function to be replaced and a particular one of the context modules 114 and/or the replacement functions 118 to be used to replace the function. As mentioned above, the context modules 114 can set context information 116 in memory. To retrieve the context information, the replacement functions 118 can be configured to, when invoked, access the memory to obtain the context information.

As an example implementation of the environment 100, consider the following operating scenario. In this example scenario, a user wishes to test functionality of a particular one of the applications 110 when the application is operating without access to the Internet. To test this functionality, a particular one of the context modules 114 is configured such that the context information 116 specifies that a replacement function is to operate based on access to the Internet not being available. The particular context module is also configured with a pointer to a particular one of the replacement functions 118.

Further to the example operating scenario, the user configures the replacer module 112 to intercept a call to a target function from the particular application being tested, and redirect the call to the particular context module. When the application executes and issues a call to the target function, the replacer module 112 intercepts the call and forwards the call to the particular context module. The particular context module can receive the redirected function call and, in response, store the context information 116 in a portion of memory that is accessible to the particular replacement function. The particular context module can call the particular replacement function, which can access the portion of memory and retrieve the context information 116. The particular replacement function can execute and interact with functionalities of the particular one of the applications 110 based on access to the Internet not being available, even if the computing device 102 has Internet access. Thus, the context information 116 can specify device and/or software state information under which a replacement function is to operate.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment in which the techniques described herein may operate, consider now a discussion of some example methods in accordance with one or more embodiments.

Example Methods

Figure 5:
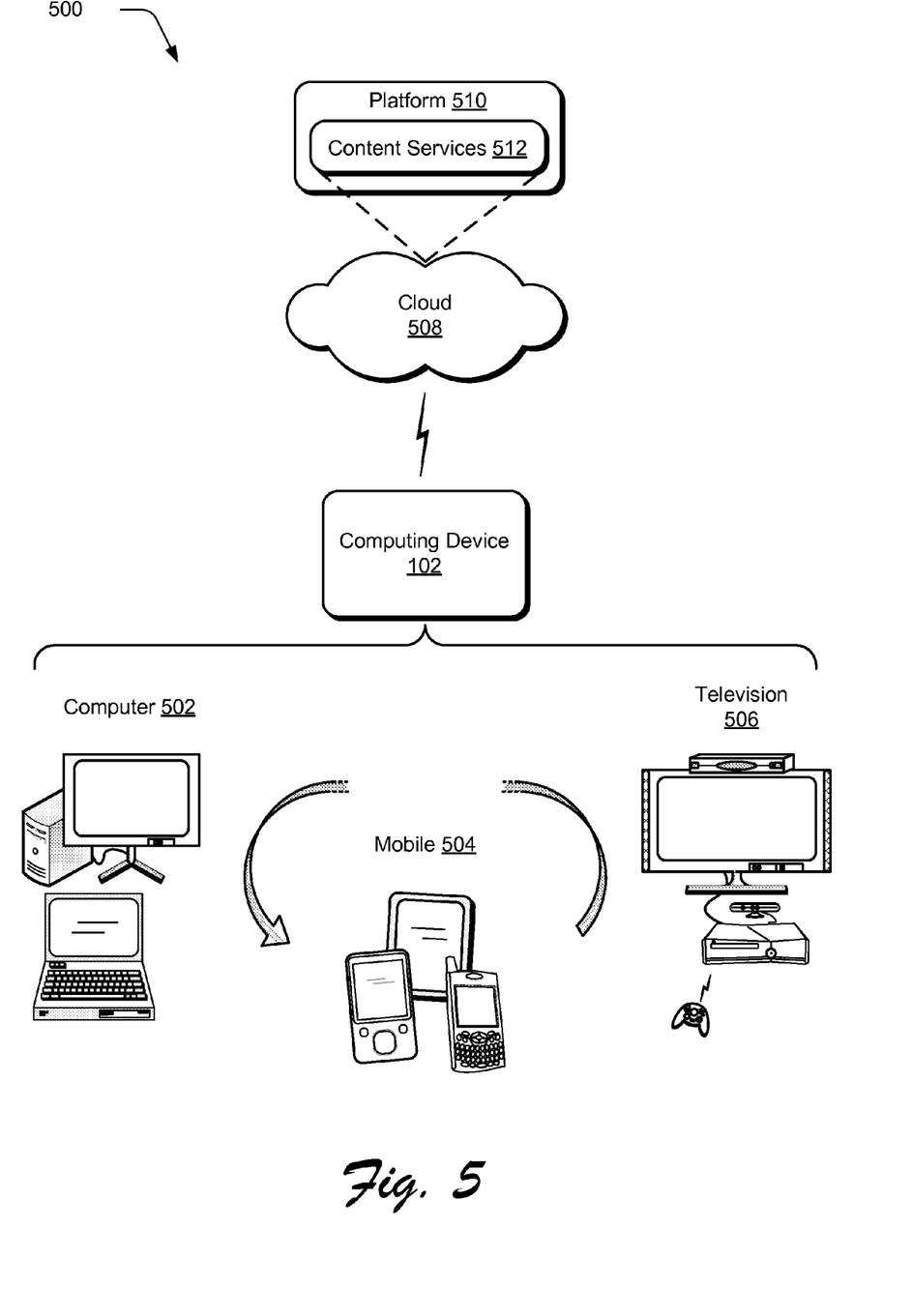
FIG. 5 illustrates an example system that includes the computing device as described with reference to FIGS. 1 and 6 in accordance with one or more embodiments.

Discussed below are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and below with reference to the system 500.

Figure 2:
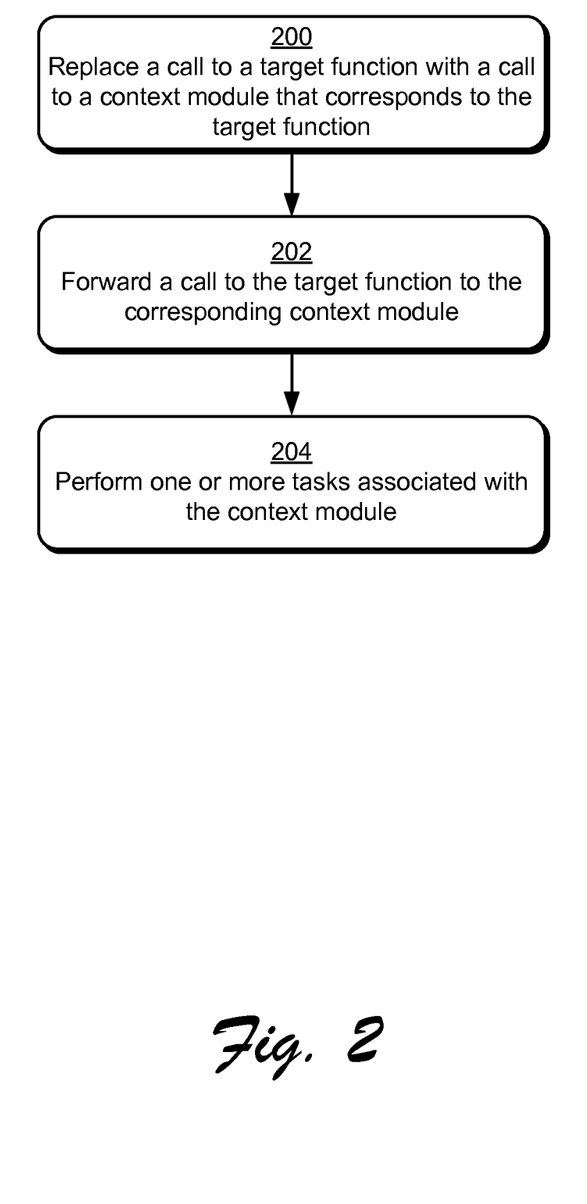
FIG. 2 is a flow diagram that describes steps in a method in accordance with one or more embodiments.

FIG. 2 is a flow diagram that describes steps in a method in accordance with one or more embodiments. Step 200 replaces a call to a target function with a call to a context module that corresponds to the target function. For example, the replacer module 112 can be configured to replace calls to target functions (e.g., calls from the operating system 108, the applications 110, and so on) with calls to corresponding context modules 114. The replacer module 112 can replace a call to a target function using one or more of a variety of function call hooking techniques.

In implementations, the replacer module 112 can be configured to include mappings of target functions to corresponding modules of the context modules 114. Thus, the replacer module 112 can inspect the mappings to determine a pointer to a particular context module that corresponds to the target function identified in an intercepted function call.

Step 202 forwards a call to the target function to the corresponding context module. For example, a call from one of the applications 110 to a particular target function can be forwarded to a corresponding context module. Step 204 performs one or more tasks associated with the context module. Further functionalities of context modules are discussed below.

Figure 3:
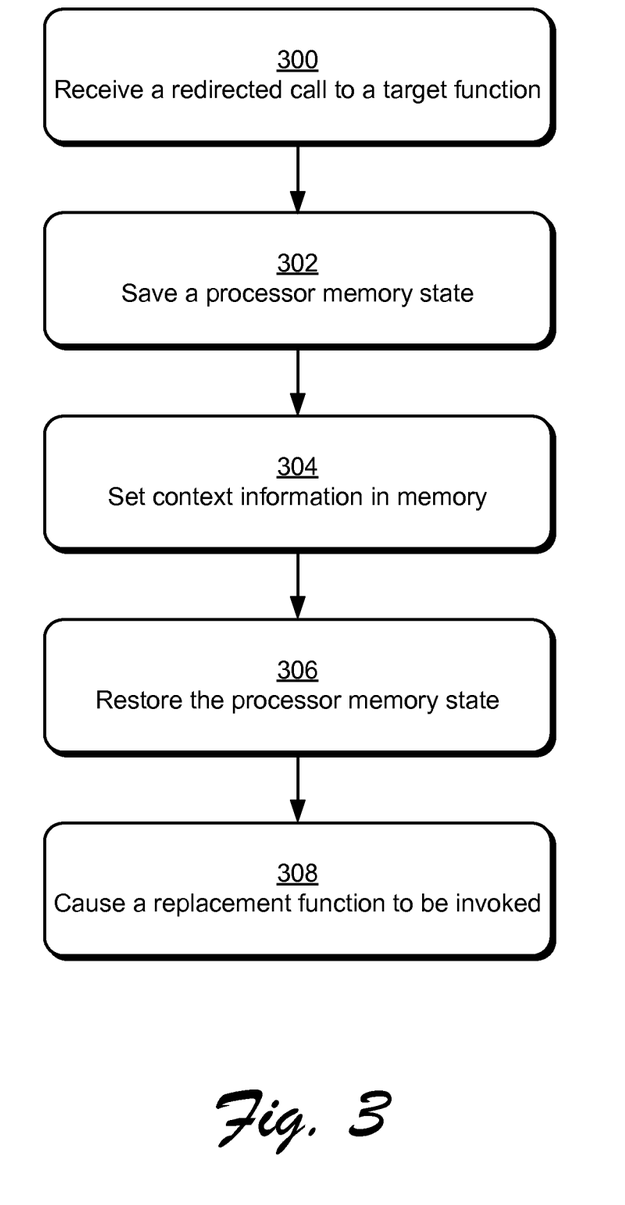
FIG. 3 is a flow diagram that describes steps in a method in accordance with one or more embodiments.

FIG. 3 is a flow diagram that describes steps in a method in accordance with one or more embodiments. In implementations, the method can be employed to preserve processor memory state across a call to a replacement function. Step 300 receives a redirected call to a target function. For example, the replacer module 112 can modify a target function such that a call to the target function is replaced with a call to a particular one of the context modules 114. When a compiler makes a call to the target function (e.g., in response to one of the applications 110 requesting that the compiler call the target function), the particular context module can be called in response.

Step 302 saves a processor memory state. For example, one of the context modules 114 can save, in memory, register values for one or more registers of the processor 104.

Step 304 sets context information in memory. For example, one of the context modules 114 can cause the context information 116 to be stored in a portion of memory. Context information includes information that can be used by a replacement function in deciding whether to perform a particular task and/or how to perform a particular task. Further examples of context information are discussed below.

In implementations, one of the context modules 114 can call a helper function and include the context information 116 along with the call. The helper function can cause the context information 116 to be saved in a portion of memory that is accessible to one or more of the replacement functions 118. For example, the helper function can save the function context information in thread local storage that is specific to a processing thread for a replacement function.

Step 306 restores the processor memory state. For example, saved register values can be restored (e.g., written) to corresponding processor registers. Step 308 causes a replacement function to be invoked. For example, one of the context modules 114 can cause a jump to one of the replacement functions 118 to occur such that the replacement function is executed. The replacement function can access the context information 116 from a portion of memory and perform one or more tasks based on the context information.

In implementations, a compiler may not be "aware" that a call to a target function may be intercepted and redirected to a context module and/or a replacement function. For instance, the compiler may operate as if the target function is being called and without knowledge of the call being redirected to a replacement function. Thus, the compiler may not preserve certain portions of processor memory that are not used by the target function when the target function executes. Accordingly, the method discussed above can preserve portions of processor memory when a call to a target function is intercepted, context information is set in memory, and/or a replacement function is called.

Figure 4:
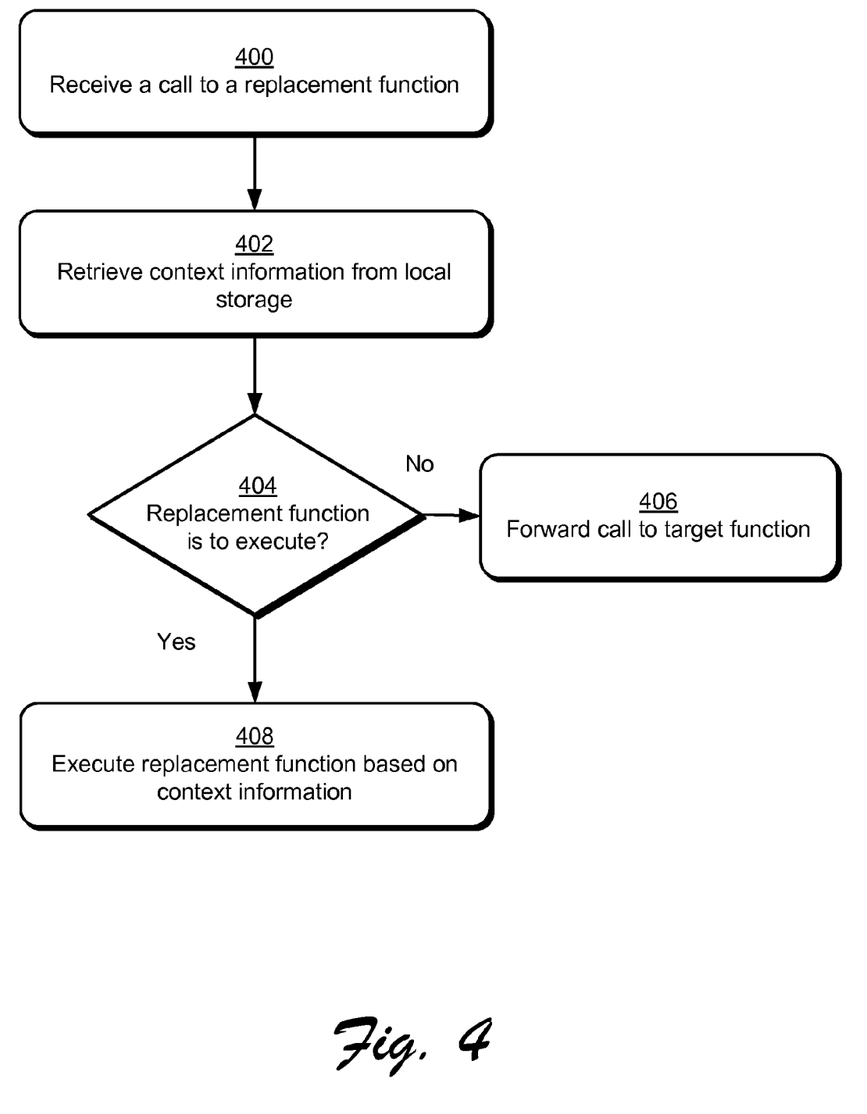
FIG. 4 is a flow diagram that describes steps in a method in accordance with one or more embodiments.

FIG. 4 is a flow diagram that describes steps in a method in accordance with one or more embodiments. Step 400 receives a call to a replacement function. For example, one of the replacement functions 118 can be invoked by one of the context modules 114. Step 402 retrieves context information from local storage. For instance, one of the replacement functions 118 can retrieve context information from thread local storage that is associated with the replacement function.

As mentioned above, context information includes information that can be used by a replacement function in deciding whether to perform a particular task and/or how to perform a particular task. For example, context information can include a filter that specifies conditions under which a replacement function is to execute or not execute. For instance, the function context information can specify that if a replacement function is being invoked by a specific function or entity, the replacement function is not to execute.

As another example, the context information can include device conditions (e.g., state conditions) under which the replacement function is to operate. For instance, the context information can specify that a replacement function is to execute as if certain device state conditions exist, even if the state conditions are not actually present on a particular device. As an example, context information can specify that a replacement function is to execute based on limited or no network connectivity, even if a device has full network access. Thus, the context information can be used to control the behavior of various replacement functions and/or target functions.

Step 404 determines, based on the context information, whether a replacement function is to execute. If the context information indicates that the replacement function is not to execute ("No"), step 406 forwards the call to a target function. For example, the call can be forwarded to a target function whose function call was previously intercepted and redirected to the replacement function. If the context information indicates that the replacement function is to execute ("Yes"), step 408 executes the replacement function based on the context information.

In implementations, the context information can indicate that under certain conditions, the replacement function is to jump to an originally-called target function. For example, the context information can include a pointer to an originally-called target function and a filter that specifies that under certain conditions, a replacement function is to invoke the originally-called target function. Thus, in the presence of such conditions, a replacement function can invoke a target function whose original function call was intercepted. Otherwise, the replacement function can execute and/or call a different replacement function.

As another example, the context information can include a pointer to a different replacement function and a filter that specifies that under certain conditions, a replacement function is to invoke the different replacement function. Thus, in the presence of such conditions, a replacement function can invoke a different replacement function. Otherwise, the replacement function can execute or forward the function call to a target function, as discussed above.

Example System and Device

FIG. 5 illustrates an example system 500 showing the computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 502, computer 504, and television 506 uses. Each of these configurations has a generally corresponding screen size and thus the computing device 102 may be configured as one of these device classes in this example system 500. For instance, the computing device 102 may assume the mobile 502 class of device which includes mobile telephones, music players, game devices, and so on.

The computing device 102 may also assume a computer 504 class of device that includes personal computers, laptop computers, netbooks, and so on. The television 506 configuration includes configurations of device that involve display in a casual environment, e.g., televisions, set-top boxes, game consoles, and so on. Thus, techniques described herein may be supported by these various configurations of the computing device 102 and are not limited to the specific examples described in the following sections.

Cloud 508 is illustrated as including a platform 510 for web services 512. The platform 510 abstracts underlying functionality of hardware (e.g., servers) and software resources of the cloud 508 and thus may act as a "cloud operating system." For example, the platform 510 may abstract resources to connect the computing device 102 with other computing devices. The platform 510 may also serve to abstract scaling of resources to provide a corresponding level of scale to encountered demand for the web services 512 that are implemented via the platform 510. A variety of other examples are also contemplated, such as load balancing of servers in a server farm, protection against malicious parties (e.g., spam, viruses, and other malware), and so on.

Thus, the cloud 508 is included as a part of the strategy that pertains to software and hardware resources that are made available to the computing device 102 via the Internet or other networks. For example, techniques for providing context for replacement functions discussed herein may be implemented in part on the computing device 102 as well as via the platform 510 that supports web services 512.

In implementations, input to the computing device 102 may be detected using touchscreen functionality in the mobile configuration 502, track pad functionality of the computer 504 configuration, detected by a camera as part of support of a natural user interface (NUI) that does not involve contact with a specific input device, and so on. Further, performance of the operations to implement techniques discussed herein may be distributed throughout the system 500, such as by the computing device 102 and/or the web services 512 supported by the platform 510 of the cloud 508.

Figure 6:
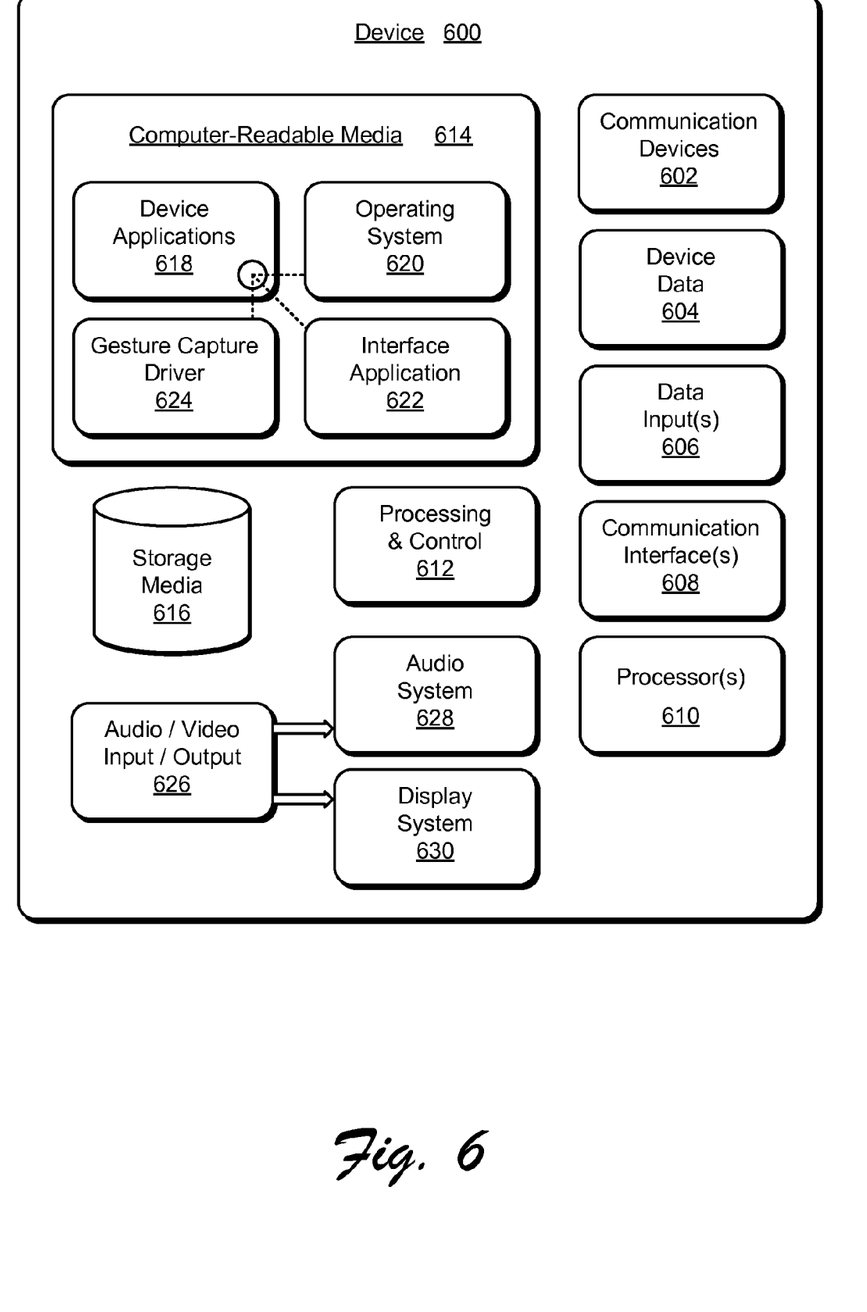
FIG. 6 illustrates an example computing device that can be utilized to implement various embodiments described herein.

FIG. 6 illustrates various components of an example device 600 that can be implemented as any type of portable and/or computer device as described with reference to FIGS. 1 and 5 to implement embodiments of the techniques for providing context for replacement functions described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable or readable instructions to control the operation of device 600 and to implement the gesture embodiments described above. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 618 also include system components or modules to implement embodiments of the techniques for providing context for replacement functions described herein.

In this example, the device applications 618 include an interface application 622 and a gesture-capture driver 624 that are shown as software modules and/or computer applications. The gesture-capture driver 624 is representative of software that is used to provide an interface with a device configured to capture a gesture, such as a touchscreen, track pad, camera, and so on. Alternatively or in addition, the interface application 622 and the gesture-capture driver 624 can be implemented as hardware, software, firmware, or any combination thereof.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Techniques for providing context for replacement functions are described. Although embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable hardware storage media comprising computer-readable instructions which, when executed, cause a computing device to perform operations comprising:
   receiving a redirected call to a target function;
   setting context information that is specific to the replacement function in a portion of memory that is local to a replacement function and responsive to receiving the redirected call;
   causing the replacement function to be invoked such that the context information is retrievable by the replacement function from the portion of memory that is local to the replacement function; and
   causing a processor memory state of the computing device to be preserved across a call to the replacement function by:
   storing, in the portion of memory that is local to the replacement function, the processor memory state for a processor of the computing device prior to setting the context information in the portion of memory; and
   restoring the processor memory state across the call to the replacement function after setting the context information in the portion of memory.

2. The one or more computer-readable hardware storage media of claim 1, wherein the context information includes state information associated with the computing device that specifies one or more conditions under which the replacement function is to execute.

3. The one or more computer-readable hardware storage media of claim 1, wherein the context information indicates one or more conditions under which the replacement function is to execute and one or more conditions under which the replacement function is not to execute.

4. The one or more computer-readable hardware storage media of claim 1, wherein the context information includes a pointer to the target function and one or more conditions under which the replacement function is to call the target function such that the target function is executable.

5. The one or more computer-readable hardware storage media of claim 1, wherein the context information includes a pointer to a different replacement function and one or more conditions under which the replacement function is to call the different replacement function.

6. The one or more computer-readable hardware storage media of claim 1, wherein the portion of memory comprises thread local storage that is associated with the replacement function.

7. The one or more computer-readable hardware storage media of claim 1, wherein the operations further comprise setting the context information in the portion of memory by calling a helper function configured to store the context information in the portion of memory.

8. The one or more computer-readable hardware storage media of claim 1, wherein the context information specifies whether to execute the replacement function based, at least in part, on a specific entity invoking the replacement function.

9. A method comprising:
   receiving a call to a replacement function in response to a call to a target function being intercepted;
   setting context information that is specific to the replacement function in storage that is local to the replacement function and responsive to receiving the call;
   in response to the receiving the call to the replacement function, causing the replacement function to retrieve the context information from the storage that is local to the replacement function;

determining one or more of whether to execute the replacement function or how to execute the replacement function based on the context information retrieved by the replacement function; and causing a processor memory state for a processor of a computing device to be preserved across the call to the replacement function by:

storing the processor memory state for a processor of the computing device prior to setting the context information in the storage; and restoring the processor memory state across the call to the replacement function after setting the context information in the storage.

10. The method as described in claim 9, wherein the storage comprises thread local storage that is associated with the replacement function.

11. The method as described in claim 9, wherein context information includes a pointer to the target function and one or more conditions under which the replacement function is to call the target function, and wherein the method further comprises calling the target function based on the presence of the one or more conditions.

12. The method as described in claim 9, wherein context information includes a pointer to a different replacement function and one or more conditions under which the replacement function is to call the different replacement function, and wherein the method further comprises calling the different replacement function based on the presence of the one or more conditions.

13. A system comprising:

one or more processors; and one or more computer-readable storage media storing computer-executable instructions that are executable by the one or more processors to perform operations including:

receiving a call to a replacement function in response to a call to a target function being intercepted;

setting context information that is specific to the replacement function in storage that is local to the replacement function and responsive to receiving the call;

in response to receiving the call to the replacement function, causing the replacement function to retrieve the context information from the storage that is local to the replacement function;

determining how to execute the replacement function based on the context information retrieved by the replacement function; and causing a processor memory state of the one or more processors to be preserved across the call to the replacement function by:

storing the processor memory state for the one or more processors prior to setting the context information in the storage; and restoring the processor memory state across the call to the replacement function after setting the context information in the storage.

14. The system as described in claim 13, the operations further including storing the context information prior to causing the replacement function to retrieve the context information.

15. The system as described in claim 13, the context information including a pointer to the target function and one or more conditions under which the replacement function is to call the target function such that the target function is executable.

16. The system as described in claim 13, the context information including a pointer to a different replacement function and one or more conditions under which the replacement function is to call the different replacement function.

17. The system as in claim 13, the context information including device conditions under which the replacement function is to operate.

18. The system as described in claim 13, the context information usable to control behavior of the replacement function.

19. The system as described in claim 13, wherein the storage comprises thread local storage that is associated with the replacement function.

20. The system as described in claim 13, the operations further including determining whether to execute the replacement function based on the context information retrieved by the replacement function.

* * * * *